United States Patent [19]

Ericson et al.

[11] 4,011,424
[45] Mar. 8, 1977

[54] POSITION INDICATOR FOR DRAWOUT APPARATUS

[75] Inventors: Eric Axel Ericson, Plainville; Frederick Daniel Kaufhold, Forestville, both of Conn.

[73] Assignee: General Electric Company, New York, N.Y.

[22] Filed: Apr. 14, 1975

[21] Appl. No.: 567,619

[52] U.S. Cl. .......................... 200/308; 200/50 AA
[51] Int. Cl.² ........................................ H01H 9/00
[58] Field of Search ............ 200/50 A, 50 AA, 308; 317/103

[56] References Cited
UNITED STATES PATENTS

| | | | |
|---|---|---|---|
| 2,777,024 | 1/1957 | West | 200/50 AA |
| 2,811,618 | 10/1957 | Cole et al. | 200/308 X |
| 2,868,930 | 1/1959 | Pistey et al. | 200/153 LA |
| 2,888,615 | 5/1959 | Tusing | 317/103 |
| 3,227,831 | 1/1966 | Jucks et al. | 200/308 X |
| 3,588,398 | 6/1971 | Siviy | 200/50 AA |

*Primary Examiner*—James R. Scott
*Attorney, Agent, or Firm*—Robert A. Cahill; Walter C. Bernkopf; Frank L. Neuhauser

[57] ABSTRACT

A drawout mechanism includes a carriage mounting a circuit breaker and supported on telescoping rails to facilitate racking movement of the circuit breaker between extreme positions of electrical engagement and disengagement with respect to switchboard primary disconnect contacts. In an intermediate test position, the primary contacts are disengaged but secondary contacts of the circuit breaker and switchboard remain engaged for testing of accessorial functions. Indicator apparatus includes an elongated step cam carried by an arm pivotally mounted to the carriage. The step cam is engaged by a stationary actuator to differentially angularly orient the arm during racking movement of the circuit breaker, thus appropriately positioning a flag, also carried by the arm, to identify the various breaker positions.

10 Claims, 26 Drawing Figures

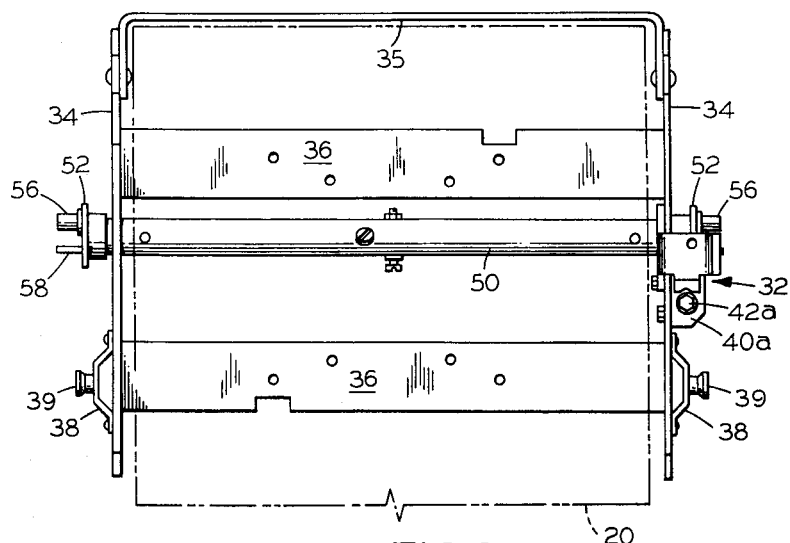
FIG. 9
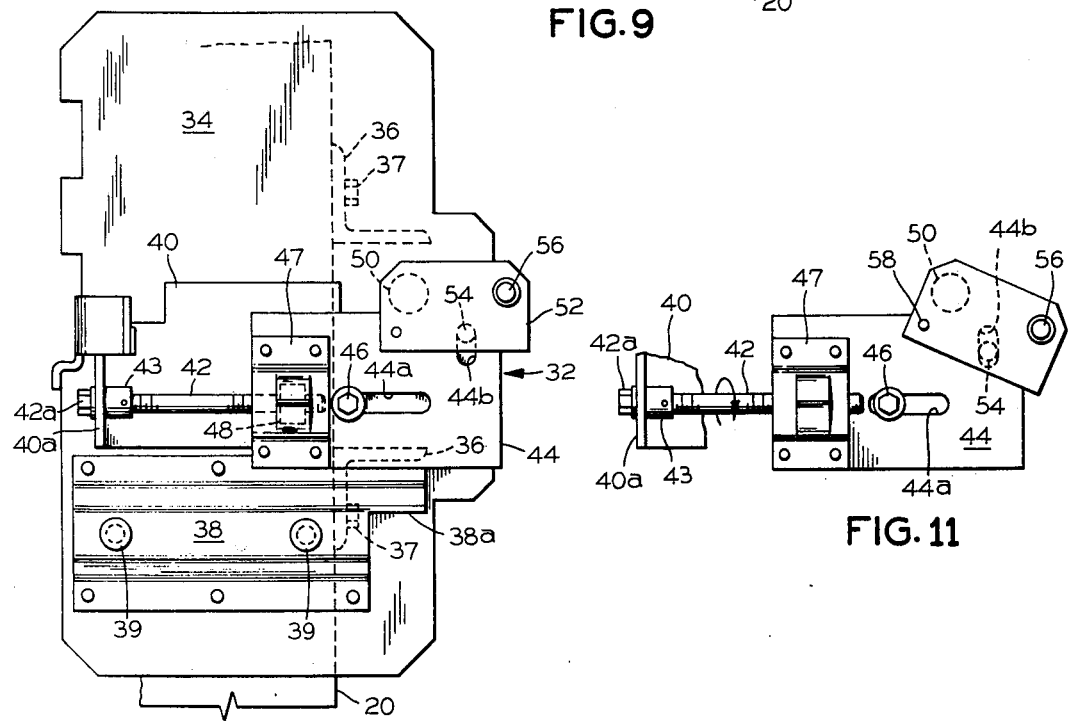
FIG. 10
FIG. 11
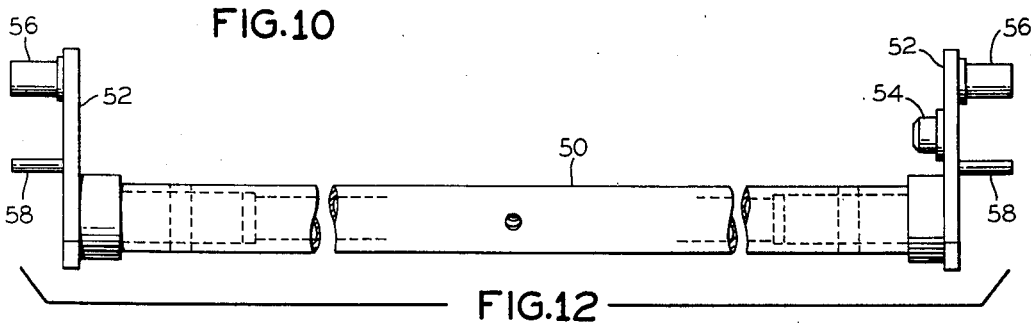
FIG. 12

POSITION INDICATOR FOR DRAWOUT APPARATUS

BACKGROUND OF THE INVENTION

The installation of electrical devices, such as circuit breakers, in switchboard and panelboard apparatus is generally of two types. In one type of installation, circuit breakers are essentially stationarily mounted to structural members or frame of the switchboard, typically with terminal electrical connection effected via bolted joints. Alternatively, circuit breakers may be physically supported solely by the switchboard buswork via these bolted terminal joints. In such stationary installations, inspection and maintenance of the circuit breaker is difficult and quite hazardous if attempted while the switchboard is live. In some situations, the hazards must be assumed, since de-energization of the switchboard and thus interruption of electrical service to all of the branch circuits in the switchboard cannot be tolerated. To reduce the hazards of working with live switchboards, devices are provided with plug-in or stab-type primary disconnect contacts which do not require direct contact and manipulation to effect their connection and disconnection with mating disconnect contacts of the switchboard. Thus the device, e.g., circuit breaker, can be plugged in and unplugged from a live switchboard in relative safety.

In higher current applications, the circuit breakers are physically large and quite heavy, thus rendering the bodily movement of the circuit breaker necessary to electrically connect and disconnect it from the switchboard cumbersome if not impossible, unless mechanical assistance is afforded. Not only does the weight and bulk of the circuit breaker become difficult for the electrician to handle, but, as the current ratings increase, the contact pressures of the primary disconnect contacts become extremely difficult, if not impossible to overcome. To surmount these problems, so-called "drawout" apparatus has been resorted to for both supporting the circuit breaker and affording mechanical assistance in overcoming the extreme contact pressures of the disconnect contacts.

Drawout apparatus are typically designed to support the electrical device for racking movement between an extended position well out of an enclosure compartment and an engaged position within the compartment where the load current carrying primary disconnect contacts of the device and enclosure are fully engaged. Since electrical devices, such as circuit breakers for industrial applications, are typically equipped with a variety of accessorial functions served by external auxiliary circuits, provisions must be made for making and breaking these auxiliary circuits as the device is moved between its extended and engaged positions. To this end, so-called mating secondary disconnect contacts are mounted with the device and the enclosure. These secondary contacts are engaged while the device is in the engaged position and become disengaged at some point during movement of the device out to the disengaged position. It is common practice to provide a test position for the device intermediate its engaged and extended positions where the primary contacts are separated but the secondary contacts are still engaged. In this test position, the accessorial functions can be thoroughly tested in safety while the device is "dead".

It is understandably important that the operator of the drawout apparatus be constantly aware of the position of the device relative to the enclosure for his own safety as well as that of the equipment. To this end, position indicators are utilized to display or otherwise indicate the position of the device relative to the enclosure.

It is an object of the present invention to provide for utilization in drawout apparatus an improved position indicator for indicating the position of an electrical device relative to an electrical enclosure.

A further object is to provide a position indicator of the above character capable of providing a highly visible, unambiguous display of the position of the device relative to the enclosure.

Yet another object is to provide a position indicator of the above character which is reliable and automatic in operation, and inexpensive to manufacture.

Other objects of the invention will in part be obvious and in part appear hereinafter.

SUMMARY OF THE INVENTION

In accordance with the present invention, there is provided in a drawout apparatus for racking relatively large, industrial type electrical devices, such as circuit breakers, into and out of electrical enclosures an improved position indicator for providing a continuing indication of the position of the device relative to the enclosure. The position indicator of the present invention includes an elongated arm pivotally mounted to a carriage mounting the device and, in turn, supported on opposed rail assemblies for racking movement of the device relative to the enclosure. An elongated step cam, carried by the arm, consists of a series of differentially elevated, essentially straight cam segments interconnected by sharply angled cam segments. An actuator is fixedly mounted to the enclosure and thus the movement of the arm relative to the actuator corresponds to the movement of the carriage relative to the enclosure. The arm carries various position indicia, and, depending on the arm elevation. the indicia identifying the position of the carriage is exposed in a window visible by the operator of the drawout apparatus. While in the following detailed description, the arm is pivotally mounted to the carriage and the actuator is mounted to the enclosure, it will be appreciated that their positions may be reversed without departing from the spirit of the invention. Also within the present invention is the obvious modification of mounting the step cam to the enclosure and the actuator to the arm.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a better understanding of the nature and objects of the invention, reference should be had to the following detailed description taken in connection with the accompanying drawings, in which:

FIG. 9 is a front elevational view of the circuit breaker carriage utilized in the drawout apparatus of FIG. 1;

FIG. 10 is a side elevational view of the carriage of FIG. 9;

FIG. 11 is a fragmentary view of a portion of FIG. 10 illustrating the action of the racking mechanism;

FIG. 12 is an enlarged side view of the crank shaft mounted by the carriage of FIG. 9;

Corresponding reference numerals refer to like parts throughout the several views of the drawings.

DETAILED DESCRIPTION

Figure 1:
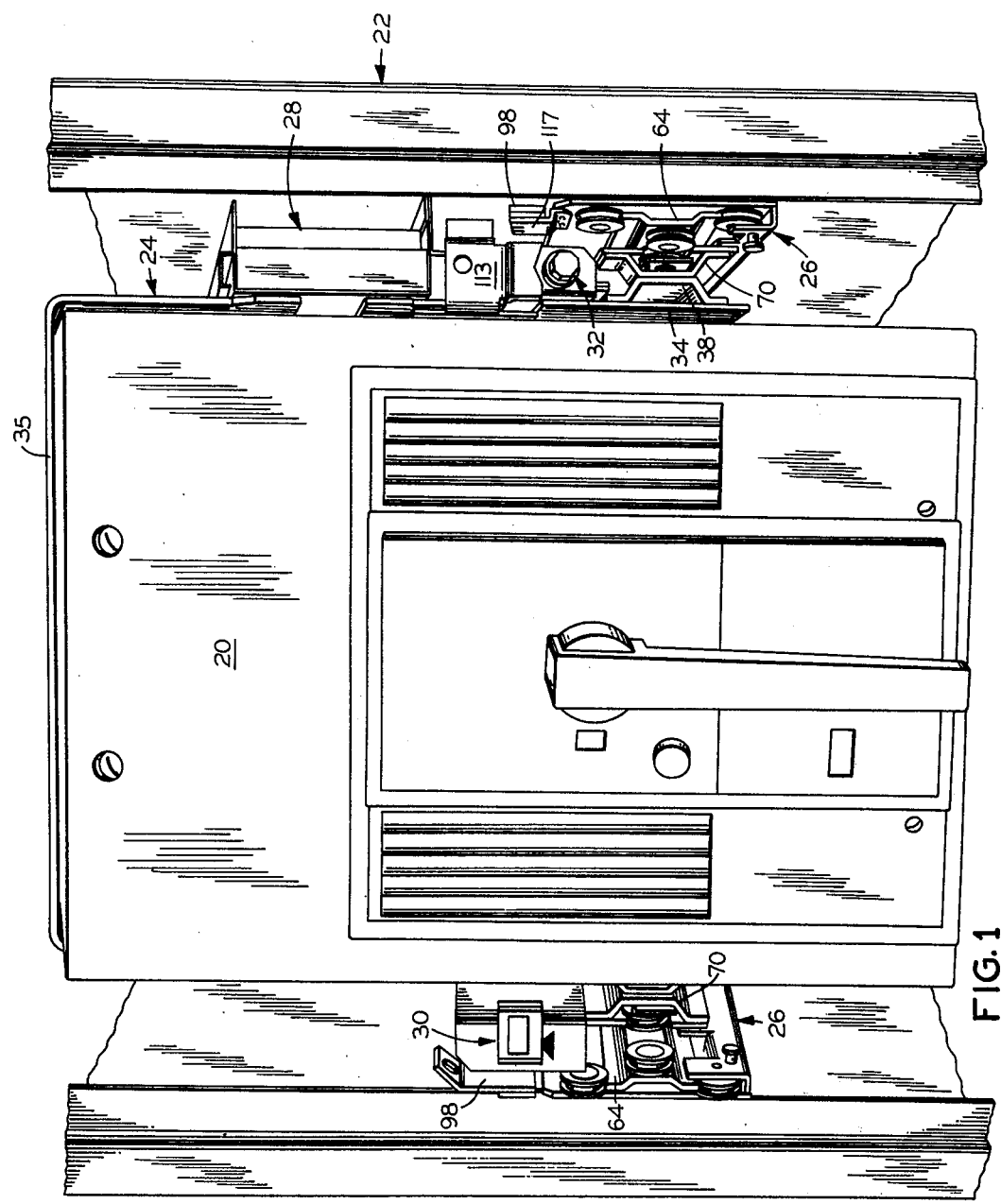
FIG. 1 is a front perspective view of a circuit breaker mounted in a switchboard compartment by a drawout apparatus embodying the present invention.
Figure 2:
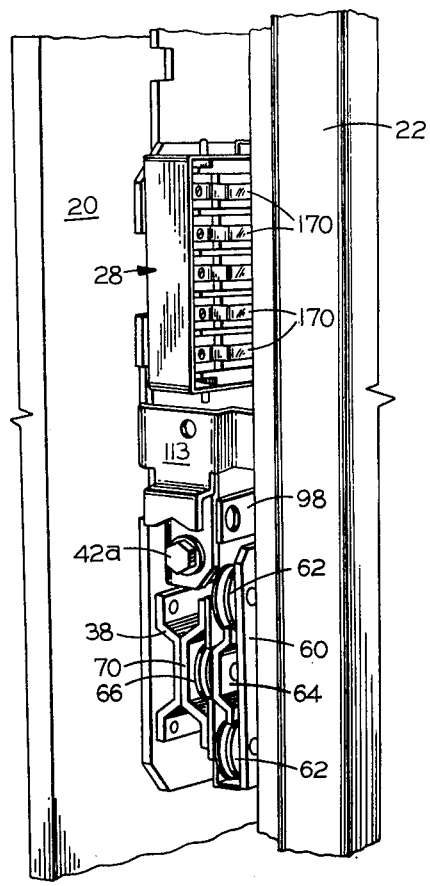
FIG. 2 is an enlarged, fragmentary perspective view of a portion of the drawout apparatus of FIG. 1.
Figure 24:
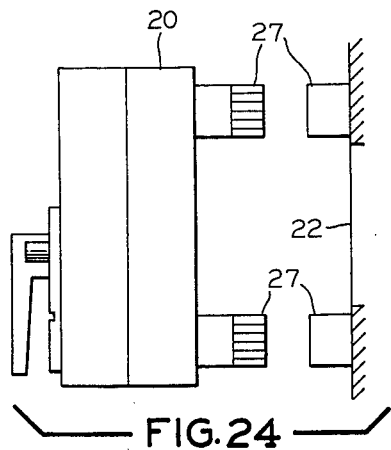
FIGS. 24, 25 and 26 are diagrammatic views of the circuit breaker in its various positions relative to the switchboard primary disconnect contacts as accommodated by the drawout apparatus of FIG. 1.
Figure 25:
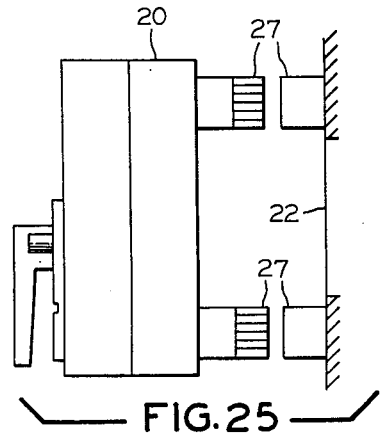
Figure 26:
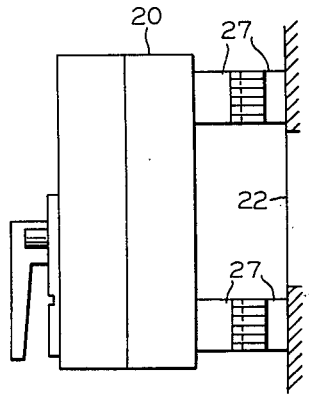

Referring first to FIG. 1, the invention is embodied in a drawout mechanism for facilitating racking movement of a large, industrial type circuit breaker 20 into and out of a cubicle or compartment of an electrical enclosure or switchboard 22. The circuit breaker is mounted by a carriage, generally indicated at 24, which in turn is supported for racking movement by opposed telescoping rail assemblies, generally indicated at 26 and mounted to the compartment sidewalls. The rail assemblies accommodate racking movement of the circuit breaker between withdrawn or extended position to a retracted or "engaged" position (FIG. 26), wherein the breaker-switchboard load current carrying primary disconnect contacts 27 are engaged. In an intermediate cirucit breaker position, commonly referred to as the "test" position (FIG. 25), the primary contacts are disengaged, while circuit breaker-switchboard secondary contacts, generally indicated at 28 in FIG. 1, remain engaged to permit operational testing of the various accessorial or auxiliary functions embodied in the circuit breaker. Intermediate the extended and test positions is a so-called "disengaged" position (FIG. 24) wherein both the primary and secondary contacts are disengaged. These engaged, test and disengaged positions are displayed frontally to the operator of the drawout mechanism by an indicator assembly, generally indicated at 30. Racking movement of the circuit breaker between its extended and test positions is readily effected manually through the convenience of the rail assemblies 26. However, due to the extreme contact pressure built into the primary disconnect contacts 27 required for cool running joints at higher current ratings, racking movement between the test and engaged positions is effected by operation of a racking mechanism, generally indicated at 32 in FIG. 1.

Carriage 24 (FIGS. 9-12)

The carriage consists of sideplate pair of spaced sideplates 34 rigidly interconnected across the top by a tie strap 35 and across the back by a pair of stringers 36. Bolts 37 threaded into the base of circuit breaker 20 clamp the stringers to the circuit breaker case and affix the circuit breaker to the carriage. A horizontally elongated bracket 38 is affixed to each sidepalte 34 for the purpose of mounting front and rear carriage support pins 39. As will be seen, these pins are received in slots provided in the inner rails of each rail assembly in mounting the circuit breaker-carriage assembly thereon. As seen in FIG. 10, mounting plate 40, affixed to the right carriage sideplate 34, is formed with a turned out front flange 40a which rotatably mounts a lead screw 42 included in racking mechanism 32. A collar 43 fitted on lead screw 42 cooperates with the lead screw head 42a to prevent axial movement thereof. A slide plate 44 is provided with a horizontally elongated slot 44a through which a bolt 46 extends; the end of this bolt being threaded into the adjacent carriage sideplate. A bracket 47 is affixed to this slide plate and captures a traveling nut 48 through which lead screw 42 is threaded. It is thus seen that slide plate 44 is free to reciprocate horizontally as the lead screw is rotated in opposite directions via a suitable tool, for example, a conventional socket wrench.

Racking mechanism 32 further includes a crank shaft 50 (FIGS. 9 and 12) extending across the back of the circuit breaker and journalled adjacent its ends in carriage sideplates 34. Affixed to each end of this shaft beyond the sideplates is a crank arm 52. The right crank arm carries an inwardly extending pin 54 which is received in a vertically elongated slot 44b in slide plate 44. It is thus seen that reciprocation of slide plate 44 by lead screw 42 swings the right crank arm 52 through an arc via pin 54, and likewise the left crank arm via interconnecting shaft 50. The crank arms mount outwardly extending crank pins 56 which, as will be described, operate on stationary cam surfaces to achieve racking movement between the test and engaged positions via operation of the racking mechanism 32. Also mounted by the crank arms are actuating pins 58 which, as will be described, trip latches as the circuit breaker is moved between the test and disengaged positions such as to reposition gates controlling entry to and egress from the test position.

Rail Assemblies 26 (FIGS. 3–5, 13 & 14)

The rail assemblies are mounted to the compartment sidewalls by mounting pans 60, each of which, in turn, mount two sets of vertically opposed rollers 62. An intermediate rail 64 is provided with upper and lower flanges 64a, which are received in the peripheral grooves of rollers 62 pursuant to rollably mounting the intermediate rails to the mounting pans 60. Each intermediate rail mounts a series of rollers 66 (FIG. 14) having grooved peripheries for receiving upper and lower rail members 68 affixed to an inner rail 70. It is thus seen that the intermediate rail rides on stationary rollers 62, while the inner rail 70 rides on rollers 66 carried by the intermediate rail, as the two rails of each rail assembly move telescopically in racking the circuit breaker in and out.

Figure 13:
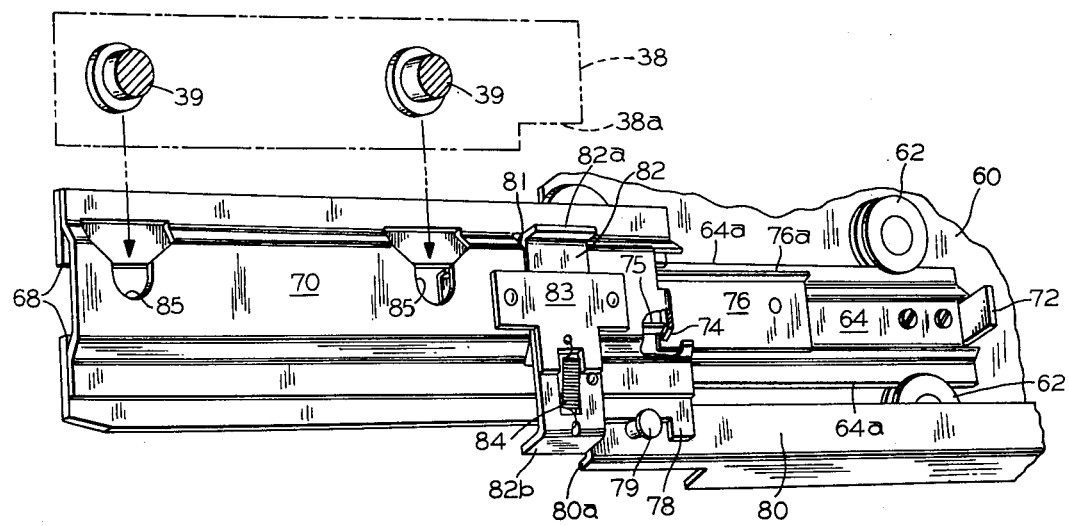
FIG. 13 is a fragmentary perspective view of one of the telescoping rail assemblies in the drawout apparatus of FIG. 1, shown in its fully extended condition.

To limit rail travel, a tab 72 (FIGS. 4 and 5) is affixed to the inner end of each intermediate rail 64. The end 72a of this tab lying behind the intermediate rails engages a stop 73 lanced from the mounting pan 60 to limit outward travel of the intermediate rails. As best seen in FIG. 13, tab 74 turned out from the inner end of each inner rail 70 engages a stop 75 struck from a plate 76 mounted by each intermediate rail 64 to limit outward travel of the inner rails. As a safety measure, tabs 78 depending from the inner ends of inner rails 70 encounter pins 79 carried at the inner ends of elongated rail latch members 80 also affixed to mounting pans 60 to limit outward travel of the rails should any of the normal stops fail. During compaction of the rails, tab 74 encounters tab 72 such that the inner and intermediate rails move together to their fully compacted conditions bottomed against the compartment rear wall.

Figure 14:
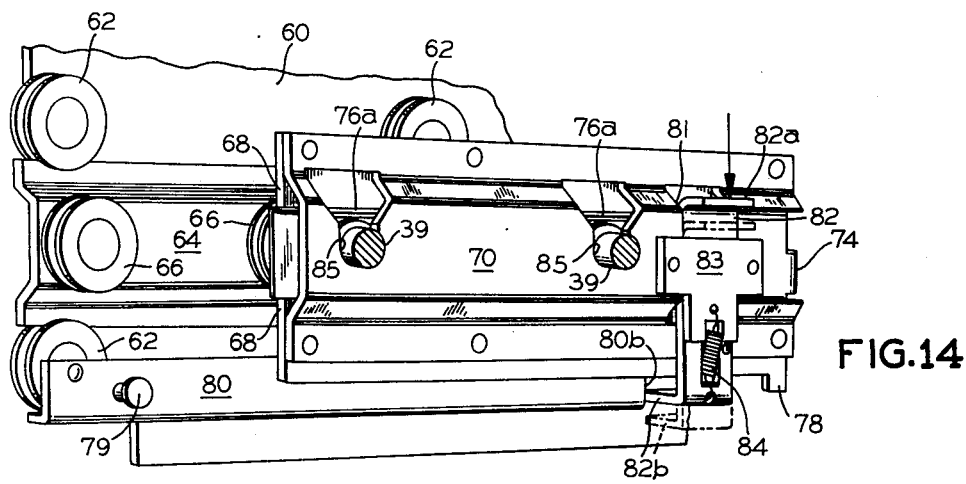
FIG. 14 is a fragmentary perspective view of a rail assembly in its fully compacted condition.
Figure 17:
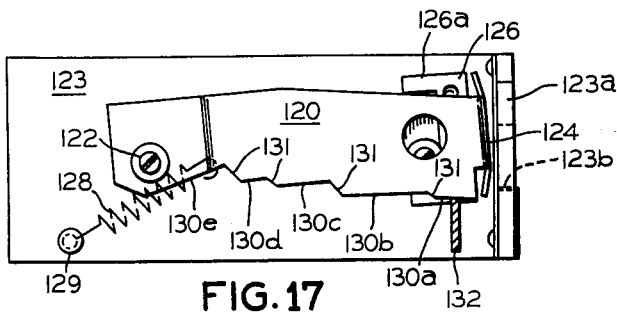
FIGS. 17, 18 and 19 are a series of side views of a position indicator utilized in the drawout apparatus of FIG. 1.
Figure 18:
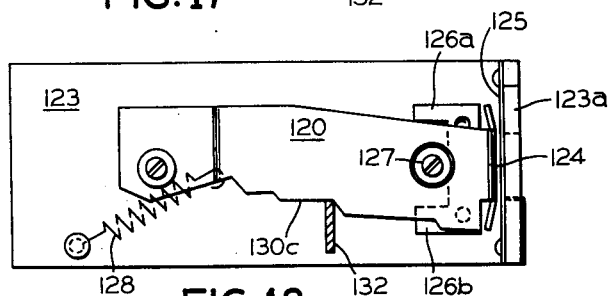

Adjacent its inner end, each inner rail 70 is provided with a vertical slot 81 in which is accommodated a rail stop latch 82 (FIGS. 13 and 14). Each latch is mounted to its inner rail by opposed brackets 83, and is biased upwardly in its slot 81 by a spring 84. The upper end portion 82a of each latch 82 is bent inward, while the lower end portion 82b is bent outward. As seen in FIG. 13, the lower portions 82b serve as stops, which, with the latches 82 elevated by springs 84, engage the front edges 80a of rail latch members 80 to lock the rails 64, 70 in their fully extended conditions. Similarly, with the rails fully compacted, as seen in FIG. 14, and the latches 82 elevated, the latch stops 82b engage the rear edges 80b of rail latch members 80 to prevent outward travel of the rails. With the rails latched in their fully extended conditions, inner rails 70 are held stationary to thus facilitate mounting of the circuit breaker-carriage assembly with the headed carriage pins 39 received in upwardly opening notches 85 formed in the inner rails. In so mounting the circuit breaker, a rearward extension 38a of each bracket 38 (FIG. 10) engages the turned-in upper end portions 82a of latches 82, automatically depressing same to drop their lower stop portions 82b below rail latch members 80 and thus free the rail for compaction.

It is thus seen that as long as the circuit breaker-carriage assembly is mounted on the rail assemblies 26, latches 82 are automatically disabled, freeing the rail assemblies to accommodate racking movement. However, with the circuit breaker-carriage assembly dismounted, these latches are effective to lock the rail assemblies in either their fully extended or fully compacted conditions; the latter being a convenience during shipment of the switchboard sans the circuit breaker-carriage assembly.

It will also be noted that with the rail assemblies fully extended, the circuit breaker-carriage assembly, while supported by the inner rails, may be swung over on the two forward pins 39 to an inverted orientation, thereby facilitating inspection and maintenance of the circuit breaker and switchboard primary contacts. This releases latches 82 to lock the rail assemblies in their fully extended conditions. To permit inverting the circuit breaker in the first instance, the rails must be fully extended to retract an elongated latching flange 76a formed with plate 76 carried by each intermediate rail 64. It is seen that, as the rails are compacted, these latching flanges immediately ride over the heads of the two rear carriage pins 39 in notches 85 and ultimately the two forward pins to lock the circuit breaker-carriage assembly on the rails in a highly stable manner.

Racking Mechanism 32 (FIGS. 3–12 & 15)

That portion of the racking mechanism carried by carriage 24, namely the racking screw 42, slide plate 44, crank arms 52, crank pins 56, etc., has already been described in conjunction with FIGS. 9–12. The remaining, stationary portion of the racking mechanism is carried by mounting pans 60 (FIGS. 4–8) affixed to the compartment sidewalls. To each mounting pan there is mounted a plate 90 having formed therein a double acting cam slot 92 extending from an upwardly directed opening downwardly and somewhat rearwardly. The crank pins 56 operate in these cam slots; acting on the forward edges 92a thereof to draw the circuit breaker from the test position inwardly to the engaged position and acting on the rearward edges 92b thereof to draw the circuit breaker back to the test position. This action is implemented by the rotation of the racking mechanism lead screw 42 in one direction to swing the crank pins downwardly in slots 92 and draw the circuit breaker into the engaged position and by rotation of the racking screw in the opposite direction to swing the crank pins upwardly in the slots to back the circuit breaker off to the test position. Guide plates 93, affixed to mounting pans 60 and extending forwardly of the cam slot, have laterally flared frontal portions 93a positioned to engage the crank pins 56 and correct any lateral misalignment of the circuit breaker-carriage assembly as it approaches the test position.

Figure 7:
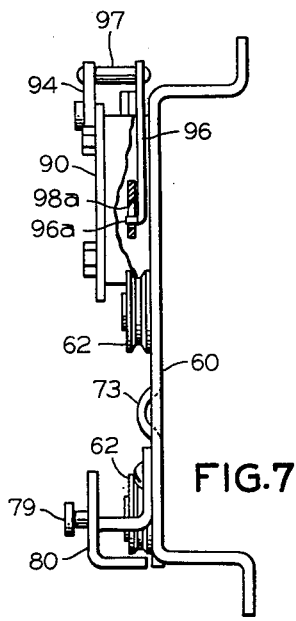
FIG. 7 is an end elevational view of the drawout apparatus portion of FIG. 5.

Entry and exit of the crank pins 56 relative to slots 92 and thus movement of the circuit breaker between the test position and the disengaged position is controlled by a gate 94 pivotally mounted at 95 to each plate 90. As best seen in FIG. 7, depending link 96, affixed to each gate by pins 97, terminates in an offset tab 96a which is engaged in a vertically elongated slot 98a formed in the inner end portion of an elongated gate operator arm 98. The outer end of each arm terminates in a handle 98b accessible to an operator at the front corners of the compartment. It is seen that pulling the arms 98 outward pivots the gates upward to permit the crank pins 56 to move into positions immediately above the openings into cam slots 92 as the circuit breaker is manually shoved into the test position from the disengaged position; the test position being determined by abutment of the crank pins against the upper terminal portion of cam surface 92b. Similarly, with the gates pivoted upward, the crank pins are free to move away from the slot openings, thus permitting the circuit breaker to be manually pulled out from the test position into the disengaged position.

In order that the gates 94 need not be manually held open to permit entry and egress of the crank pins 56, gate actuating arms 98 are equipped with latches to sustain their extended position. Each such latch comprises an elongated latch plate 100 pivotally mounted on a post 102 laterally outstanding from each mounting pan 60. The posts pass through elongated slots 98c in arms 98 and thus also serve to slidingly mount the arms. Additional mounting support for the arms is afforded by brackets 104 affixed to the mounting pans with one bracket fastener extending through a second elongated slot 98d in each arm. Each arm 98 carries a pin 106 which operates in a T-shaped slot 108 formed in latch plate 100. A spring 110 is connected between a tab 100a offset from latch plate and pin 106 to bias the latch plates to rotation about post 102 (counter-clockwise in the case of the one latch plate shown in FIG. 5. It is seen that when the arms 98 are pulled out to open gate 94, the pins 106 move forward in their associated latch plate slots 108. When the arms are pulled out to their full extent, springs 110 can then rotate the latch plates and the pins 106 enter the upper extensions 108a of slots 108 to latch up the arms in their extended positions.

Figure 8:
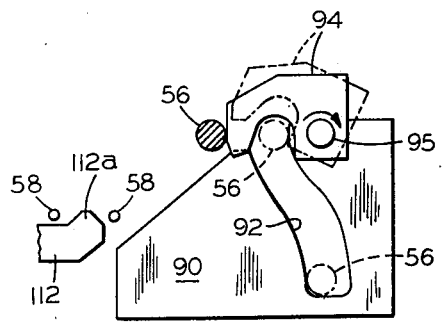
FIG. 8 is a fragmentary, somewhat diagrammatic, front elevational view of a portion of FIG. 5, to illustrate the action of the gate controlling movements of the circuit breaker between its test and disengaged positions.

To automatically release the arms 98 once the crank pins have entered or left the cam slots 92, the latch plates are provided with rearward extensions 112, each carrying an upwardly facing nose 112a. When the latch plates are cocked to latch the arms in their extended positions, the noses 112a are elevated into positions where they are engaged by the gate actuating pins 58 carried by the crank arms 52 as the circuit breaker makes its final approach into the test position and as the circuit breaker exits the test position into the disengaged position (FIG. 8). It is seen that this engagement by pins 58 rotates the latch plates to remove the pins 106 from upward slot extensions 108a to unlatch the arms which are then retracted by springs 110, closing gates 94. The slots 108 are provided with non-latching, downward slot extensions 108b to accommodate latch plate overtravel in response to actuating pin engagement, as may be occasioned by manufacturing tolerances. As a backup for the automatic unlatching of arms 98 and closure of gates 94, a lever 111, accessible at each front cover of the compartment, is pivotally mounted at 111a to each pan 60. The inner ends of these levers are situated to engage and rotate the latch plates 100 in directions to move pins 106 out of slot extensions 108a and thus unlatch arms 98. A stop 111b outstanding from each pan 60 maintains the levers poised in operative relation with the latch plates.

Figure 15:
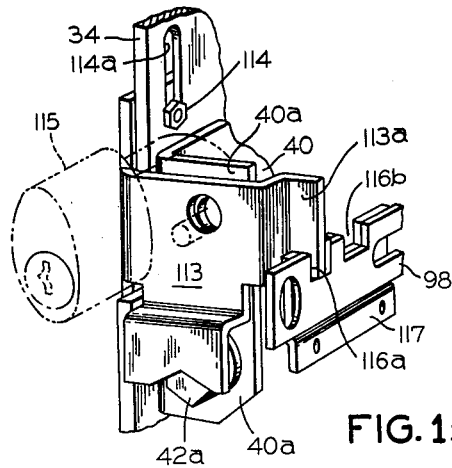
FIG. 15 is a fragmentary, perspective view of a portion of FIG. 1, illustrating the locking feature for locking the circuit breaker in either its disengaged or test positions.

It is often desirable to lock the circuit breaker in various positions so as to prevent unauthorized operation of the drawout apparatus. To serve this purpose, a locking slide 113, as best seen in FIG. 15, is mounted by fasteners 114 received in vertically elongated slots 114a formed in the right carriage sideplate 34. This slide is provided with an offset lower portion designed to deny access to the racking screw head 42a when the slide is in its lower position. In this position apertures in the locking slide and the flange 40a line up, such as to receive the hasp of a padlock 115, seen in phantom. Thusly padlocked, the locking slide cannot be raised to permit fitting a socket wrench on the racking screw, and thus the racking mechanism cannot be operated.

It is desired that padlocking be permitted only with respect to the test and disengaged positions, and to this end the slide 113 is provided with a laterally extending flange 113a which drops into notches 116a or 116b formed in the upper edge of the right gate operator arm 98 when the circuit breaker is in the disengaged and test positions, respectively. A bracket 117, affixed to mounting pan 60, has notches which line up with notches 116a, 116b when the arm 98 is in its retracted, gate closure position. As thus seen, with the circuit breaker in its disengaged position, slide 113 can be dropped down to obstruct the racking screw head, and concurrently flange 113a enters the aligned notches 116a in arm 98 and bracket 117 to prevent both manual movement of the circuit breaker and pulling of the arm to open the right gate 94. In the test position, the flange 113a drops into the notches 116b to prevent movement in either direction away from the test position.

Position Indicator Assembly 30 (FIGS. 17–21)

Figure 20:
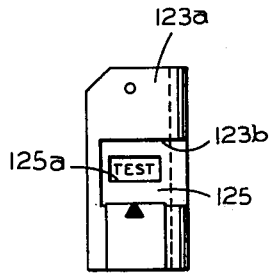
FIG. 20 is a front view of the position indicator in its condition illustrated in FIG. 18.
Figure 19:
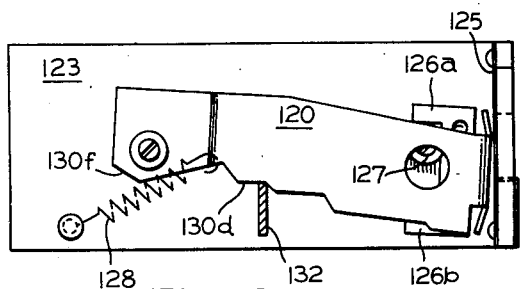
Figure 21:
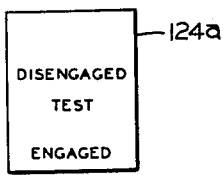
FIG. 21 is a plan view of the position indicia bearing label utilized in the position indicator of FIGS. 17, 18 and 19.

The position indicator assembly includes an arm 120 pivotally mounted at 122 to a bracket 123 affixed to the left carriage sideplate 34. The forward portion of arm 120 is laterally offset from bracket 123 and terminates in a bent back flag 124 to which is affixed a label 124a (FIG. 21) bearing the words "engaged", "test" and "disengaged", one above the other. The laterally turned front end portion 123a of bracket 123 is provided with a window 123b immediately in front of flag 124 (FIG. 20). Affixed to the back of bracket portion 123a is a plate 125 having an aperture 125a exposing one vertical segment of label 124a. A flange 126 turned back from the side edge of flat 124 opposite the termination of arm 120 carries an upper stop 126a and a lower stop 126b which engage a stop pin 127 carried by bracket 123 to determine the limits of pivotal movement of the indicator arm. The arm is biased downward in the clockwise direction by a spring 128 anchored at one end to a post 129 carried by bracket 123.

The bottom edge of arm 120 is machined to provide a step cam having a series of straight segments 130a–130e connected by sharply angled segments 131. Operating against this step cam is a stationary indicator actuator 132 constituted by a laterally turned flange carried by bracket 104 (FIGS. 4–6) affixed to mounting pan 60. It is thus seen that as the circuit breaker is moved in and out, the indicator arm 120 is variously angularly positioned depending on which step cam segment 130a–130e is riding on actuator 132. By correlating the positioning of the indicia on the label 124a affixed to flat 124 with these cam segments, the position of the circuit breaker can be read through the aperture 125a in plate 125. Thus, when cam segment 130a is riding on actuator 132, the word "engaged" is visible in aperture 125a. As the circuit breaker is withdrawn by operation of the racking mechanism 32, cam segment 130b rides onto actuator 132 and arm 120 is pivoted downward an increment by spring 128 to remove the word "engaged" from in back of aperture 125a. By virtue of the sharply angled transition cam segment 131 the change in indication is rather abrupt. While cam segment 130b is riding on actuator 132, the primary disconnect contacts are engaged, but not fully so, and therefore the indicator can not properly display the word "test" in aperture 125a. To do so would create a false and extremely hazardous situation. On the other hand, to continue displaying the word "engaged"

while the primary contacts are not fully engaged is equally hazardous, since the current carrying capacity of partially engaged primary contacts is understandably greatly diminished. Accordingly, during the transitionary movement between the engaged and test positions while the primary contacts are progressively disengaging, arm 120 is angularly positioned by cam segment 130b to align in aperture 125a the blank segment of label 124a between the words "engaged" and "test". Thus, the operator is advised that the circuit breaker is in neither the test nor the engaged position, but rather at some point in between.

Continued withdrawal by the racking mechanism ultimately separates the primary contacts, and, when crank pins 56 clear cam slots 92, cam segment 130c will have riden down on actuator 132. Arm 120 abruptly drops down an increment to display the word "test" in aperture 125a. The circuit breaker is now in the test position, wherein the switchboard-circuit breaker secondary contacts are still engaged, but their primary contacts are completely disengaged. Consequently the circuit breaker is no longer live and the various accessorial functions served by these secondary contacts can be operationally tested in complete safety.

Upon manual withdrawal of the circuit breaker from the test position, cam segment 130d rides onto actuator 132 and arm 120 abruptly drops down an increment to display the word "disengaged" in aperture 125a. The operator is thus advised that the circuit breaker is in the disengaged position with both the primary and secondary contacts disengaged. Continued manual withdrawal brings the circuit breaker into the extended position and cam segment 130e rides onto actuator 132. Arm 120 drops down another increment to display a blank label segment in aperture 125a. By inspection of the circuit breaker position, the operator can not confuse this blank designation with the blank designation displayed in the transition between the test and engaged positions.

In the fully extended position, cam segment 130e rides off the actuator 132, however, stop 126a engages pin 127 to inhibit further downward movement of arm 120. The trailing edge of cam segment 130e is chamfered, as indicated at 130f, such that the actuator 132 will readily pick up the step cam as the circuit breaker is racked in from the fully extended position. It will be appreciated that the indicator assembly operates in reverse fashion from that described above as the circuit breaker is racked into the compartment through the disengaged and test positions to the engaged position. It will also be appreciated that the indicator arm could be mounted by the switchboard and the actuator by the circuit breaker carriage and achieve comparable, unambiguous position indication.

Figure 16:
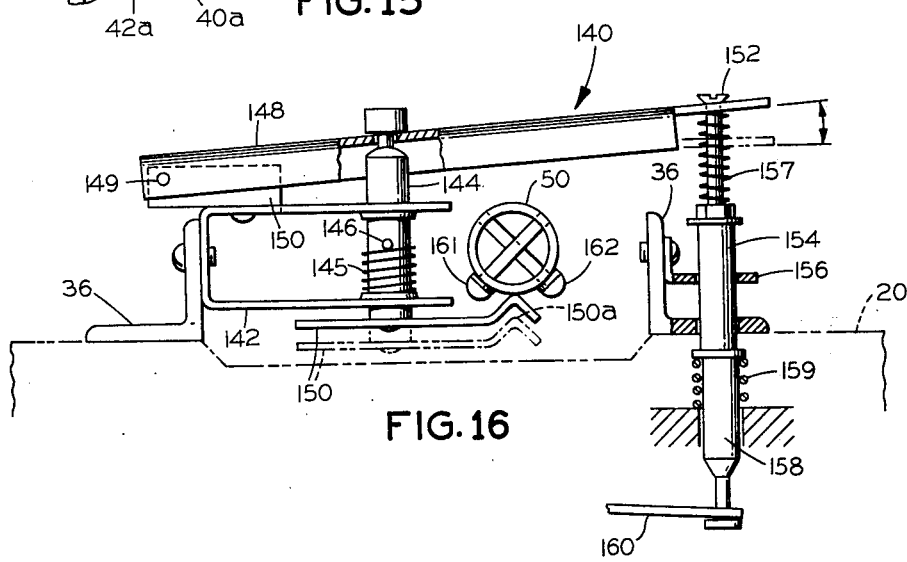
FIG. 16 is an end view of a circuit breaker interlock operating off the crank shaft of FIG. 12.

Trip Interlock 140 (FIG. 16)

To insure safe operation of the drawout apparatus of the present invention, a trip interlock, operating off the racking mechanism 32, automatically trips the circuit breaker to an open circuit condition during initial movement of the circuit breaker away from its engaged position. The trip interlock is structured, once the circuit breaker has reached its test position, to permit resetting and reclosure of the circuit breaker in order that the various accessorial functions can be fully tested. Since the primary contacts are disengaged while the circuit breaker is in its test position, reclosure of the circuit breaker contacts can be effected in relative safety.

Referring to FIG. 16, a U-shaped bracket 142, affixed to one of the carriage stringers 36, mounts a plunger 144. A spring 145 acting on a pin 146 extending transversely through plunger 144 biases this plunger upward as seen in FIG. 16. The upper end of plunger 144 is necked down for engagement with an elongated lever 148 pivotally mounted at 149 to block 150 affixed to bracket 142. Spring 145 is thus effective, through plunger 144, to elevate the free, right end of lever 148. The lower end of plunger 144 carries a cam follower plate 150 having a crooked end 150a which is urged by spring 145 into engagement with the periphery of shaft 50 interconnecting the right and left crank arms 52 (FIGS. 9–12).

The free end of lever 148 is engaged under the head of a screw 152 adjustably threaded into the end of a plunger 154 slideably mounted in an aperture in the other carriage stringer 36 and in an aperture provided in a secondary bracket 156 affixed to this stringer. A compression spring 157 mounted on screw 152 operates between lever 148 and the upper end of plunger 154. The lower end of this plunger acts on the end of still another plunger 158 mounted within the circuit breaker case. A spring 159 acts on the flanged upper end of plunger 158 to normally bias it upwardly as seen in FIG. 16. The lower headed end of plunger 158 engages a latch member 160 included in the circuit breaker operating mechanism. Spring 159, in normally urging the plunger 158 upwardly, causes the headed lower end of this plunger to pick up latch 160, tripping the circuit breaker in the first instance and, once tripped, to prevent reclosure of the circuit breaker internal contacts. Thus, the circuit breaker contacts can only be closed as long as plunger 158 is depressed by plunger 154, such as to release latch 160, whereupon the circuit breaker operating mechanism can be reset and the contacts closed.

To operate the trip interlock 140 off the racking mechanism 32, a pair of headed screws 161 and 162 are threaded transversely through shaft 50. The angular locations of these screws are such that their heads depress cam plate 150 when the racking mechanism is operated to position the circuit breaker in either the engaged or test positions. It is seen that when the head of either screw 161 or 162 engages the follower end portion 150a of cam plate 150, plunger 144 is depressed, causing lever 148 to pivot downwardly. The free end of this lever acting on spring 157 overpowers spring 159 to depress both plungers 154 and 158 to release the circuit breaker latch member 160. The presence of spring 157 accommodates any overtravel of lever 148 occasioned by manufacturing tolerances. With the latch thus released, circuit breaker 20 can be closed. Upon operation of the racking mechanism, the consequent rotation of shaft 50 to rack the circuit breaker from the test position toward the engaged position or vice versa, the head of one of the screws 161, 162, as the case may be, releases the cam plate, whereupon spring 145 pushes plunger 154 upward, raising the free end of lever 148. Spring 159 pushes plungers 154 and 158 upwardly, and latch 160 is thus picked up to trip the circuit breaker 20. By virtue of this construction, the trip interlock 140 is capable of insuring that the circuit breaker is open during engagement and disengagement of the primary contacts. It will be appreciated that should the primary contacts begin engaging or disengaging while the circuit breaker is closed, arcing and consequent damage to the primary contacts can result. Trip interlock 140 insures that this cannot happen, even inadvertently. It will also be appreciated that during transitionary movement between the test position and the fully engaged position, the circuit breaker is not only open, but is prevented from being closed by trip interlock 140.

Secondary Contacts 28 (FIGS 1–3, 22 & 23)

Figure 3:
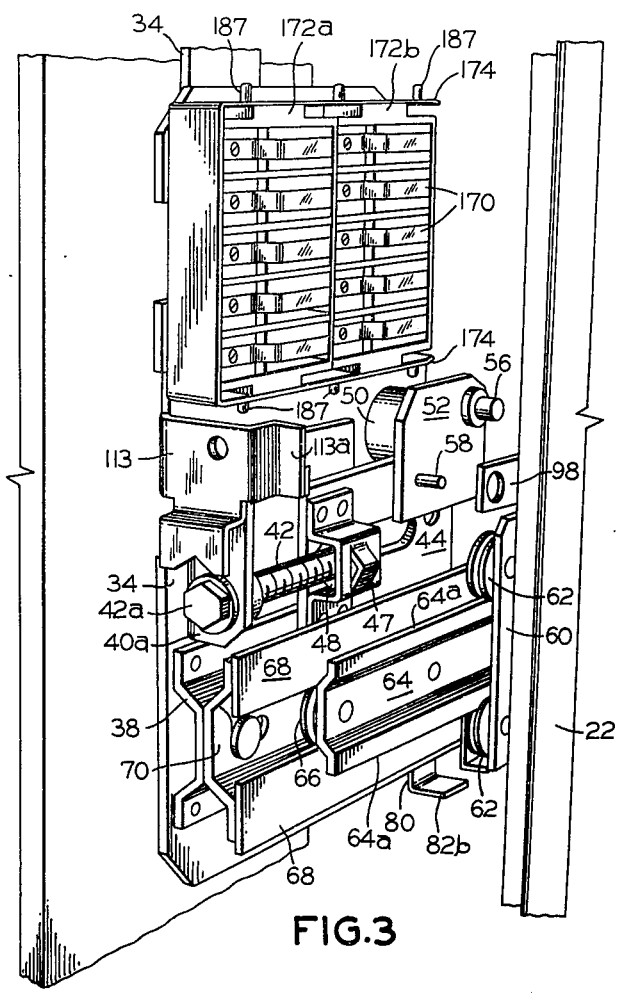
FIG. 3 is a fragmentary perspective view of the portion of the drawout apparatus of FIG. 2 with the circuit breaker in a drawn out or extended position.
Figure 4:
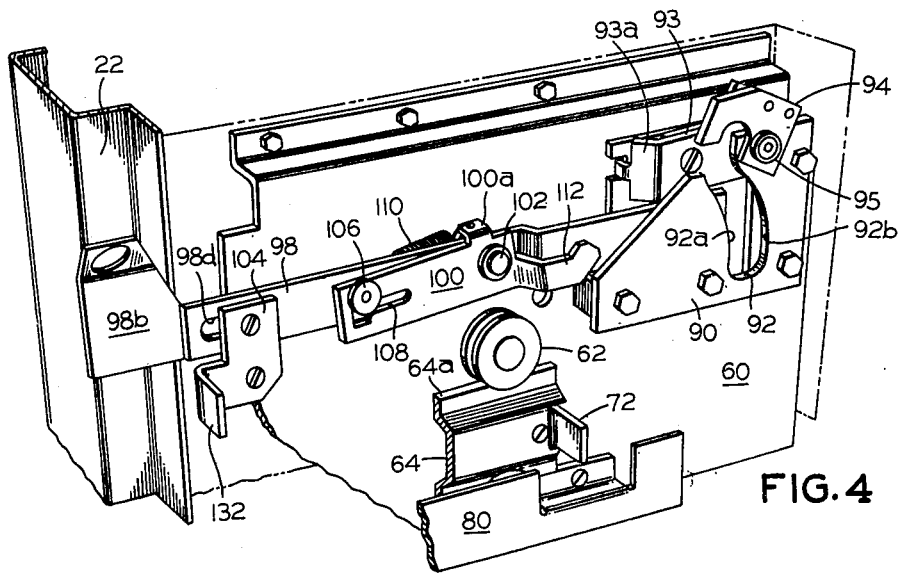
FIG. 4 is a fragmentary perspective view of that portion of the drawout apparatus of FIG. 1 mounted by the switchboard.
Figure 6:
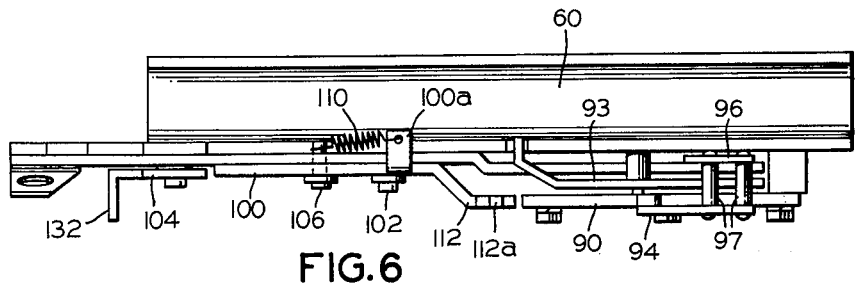
FIG. 6 is a plan view of the drawout apparatus portion seen in FIG. 5.
Figure 5:
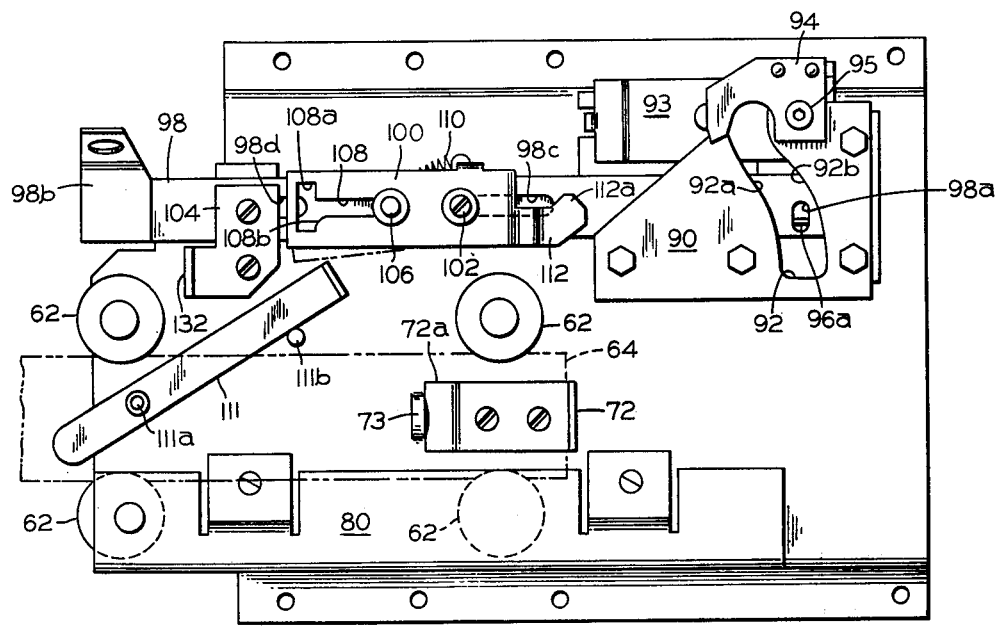
FIG. 5 is a front elevational view of that portion of the drawout apparatus seen in FIG. 4.
Figure 23:
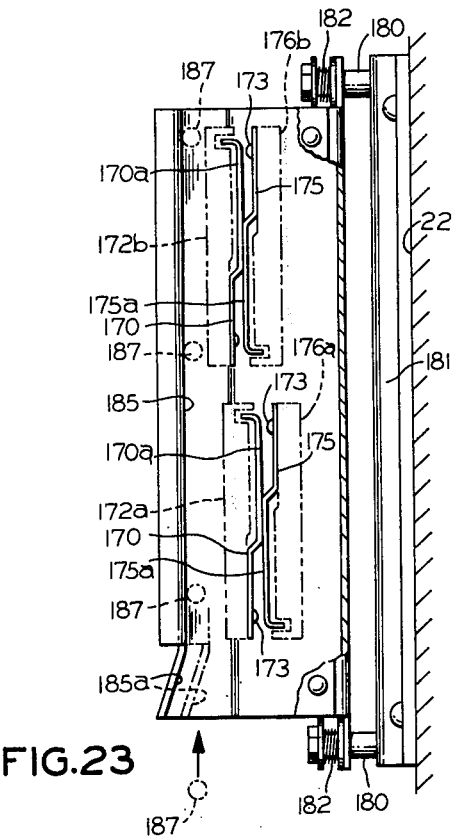
FIG. 23 is a plan view of the secondary contacts of FIG. 22 in their engaged positions.

The secondary contacts consist of a plurality of circuit breaker secondary contact strips fixedly mounted to the carriage 24, which engage a complementary plurality of secondary contact strips floatingly mounted by the compartment sidewall. These secondary contact strips are sufficiently elongated in the direction or racking movement of the circuit breaker to insure contact engagement while the circuit breaker is in either its engaged or test position. As best seen in FIGS. 3 and 23, the circuit breaker secondary contact strips, indicated at 170, are mounted in front and rear vertical arrays by terminal blocks 172a and 172b, respectively. These terminal blocks are mounted between upper and lower frame members 174 affixed to the carriage sideplate 34. As seen in FIG. 23, each contact strip 170 is secured adjacent its forward end portion to its respective terminal block 172a, 172b by rivets (not shown). Screw 173 serves as a binding head screw for making connection with auxiliary circuit leads (not shown). The rearward extension of each contact strip is offset such as to lie in spaced relation to its mounting terminal block to thus provide, by virtue of the inherent resiliency of the strip material, an essentially free floating contact engaging segment 170a.

Figure 22:
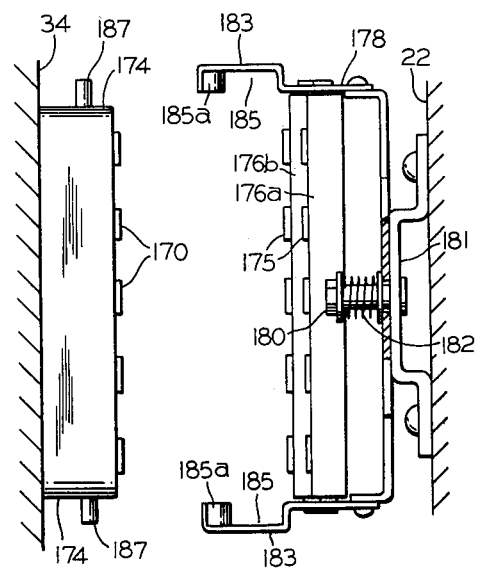
FIG. 22 is an exploded, somewhat diagrammatic end view of circuit breaker-switchboard secondary contacts utilized in the drawout apparatus of FIG. 1.

The switchboard secondary contact strips, indicated at 175 in FIGS. 22 and 23, are mounted in front and rear vertical arrays to terminal blocks 176a and 176b, respectively. The orientations of the switchboard secondary contact strips are reversed relative to the circuit breaker contact strips 170 in that rivets (not shown) clamp the rearward portions of the strips to their respective terminal blocks. Thus, the forward extensions of contact strips 175 are offset in spaced relation to their mounting terminal blocks to provide essentially free floating segments 175a for engagement with the corresponding segments 170a of the circuit breaker secondary contact strips. As best seen in FIG. 23, the front and rear vertical arrays of circuit breaker contact strips 170 are laterally offset, while the front and rear vertical arrays of switchboard contact strips 175 are laterally offset in complementary fashion so as to prevent spurious contact engagement between the rear vertical array of circuit breaker contact strips and the forward array of switchboard contact strips during racking movement of the circuit breaker.

The switchboard terminal blocks 176a, 176b are mounted in laterally offset relation in a shell 178. This shell, in turn, is slideably mounted on front and rear bolts 180 laterally outstanding from a bracket 181 affixed to the compartment sidewall. Bolts 180 pass through clearance holes in the shell base and carry compression springs 182 acting to bias the shell against mounting bracket 181. It is thus seen that the switchboard secondary contacts are mounted in an essentially free floating manner with respect to the compartment sidewall.

The upper and lower sidewalls 183 of shell 178 extend laterally well beyond the switchboard secondary contact strips 175 and terminate in opposed upper and lower, horizontally elongated guideways 185. The forward end portion of each of these guideways, specifically the outer sidewall or flange thereof, is flared away from the compartment sidewall, as indicated at 185a. The upper and lower mounting plates 174 for the circuit breaker secondary contacts each carry a series of in-line locating posts 187 which, as the circuit breaker is moved in from its extended position, engage the flared entries 185a of the upper and lower guideways 185, thereby camming the switchboard secondary contacts away from the compartment sidewall. The locating pins 187 are positioned relative to the circuit breaker secondary contacts and the guideways 185 are positioned relative to the switchboard secondary contacts such that, as the locating pins slide into the guideways, the switchboard secondary contacts are forcibly aligned for electrical contacting engagement with the circuit breaker secondary contacts as the carriage is moved into the test position and on to the engaged position. It is obvious that the circuit breaker secondary contacts can be mounted by the circuit breaker itself, rather than the carriage, and that the circuit breaker secondary contacts can be floatably mounted, rather than the switchboard secondary contacts as herein disclosed.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. In a drawout assembly including a carriage mounting an electrical device and, in turn, supported on rails for accommodating racking movement of the device into and out of an electrical enclosure, indicator apparatus comprising, in combination:
   A. an elongated arm movably mounted to one of the carriage and enclosure;
   B. a step cam elongated generally in the directions of movement of the device carriage relative to the enclosure and consisting of a series of differentially elevated, essentially straight cam segments interconnected by relatively sharply angled cam segments;
   C. an actuator, said actuator mounted by one of said carriage and enclosure and said step cam mounted by the other of said carriage and enclosure for relative movement proportional to the movement of the carriage relative to the enclosure, said arm mechanically interconnected with one of said actuator and step cam, and said actuator engaging said angled and straight cam segments to abruptly variously elevate said arm in correlation with the position of the carriage relative to the enclosure; and
   D. means carried by said arm to indicate, in accordance with the arm elevation, the various positions of the carriage as it is moved on the rails relative to the enclosure.

2. The indicator apparatus defined in claim 1, wherein said arm is pivotally mounted adjacent one of its ends.

3. The indicator apparatus defined in claim 1, wherein said step cam is formed in an elongated edge of said arm.

4. The indicator apparatus defined in claim 3, wherein said arm is pivotally mounted adjacent one of its ends to the carriage and said actuator is fixedly mounted by the enclosure.

5. The indicator apparatus defined in claim 4, which further includes a spring acting on said arm to maintain engagement of said step cam with said actuator.

6. The indicator apparatus defined in claim 4, which further includes fixed stop means limiting the pivotal motion of said arm.

7. The indicator apparatus defined in claim 4, wherein said indicating means includes a flag carried by said arm at its end opposite from its pivotally mounted end, said flag bearing plural carriage position indicia respectively correlated with said straight cam segments, and a plate stationed in front of said flag and having an aperture sized to singly expose said position indicia as said arm is variously elevated by engagement of said actuator with said straight cam segments.

8. The indicator apparatus defined in claim 7, which further includes a spring acting on said arm to maintain engagement of said step cam with said actuator.

9. The indicator apparatus defined in claim 7, which further includes fixed stop means limiting the pivotal motion of said arm.

10. The indicator apparatus defined in claim 9, wherein the trailing one of said straight cam segments terminates in an additional sharply angled cam surface to insure that said actuator will ride onto said trailing straight cam segment as the carriage moves toward the enclosure from an extended position.

* * * * *